United States Patent [19]

De Fazio

[11] Patent Number: 4,848,757
[45] Date of Patent: Jul. 18, 1989

[54] REMOTE CENTER COMPLIANCE DEVICE WITH FULLY OR PARTIALLY COIL-BOUND SPRINGS

[75] Inventor: Thomas L. De Fazio, Watertown, Mass.

[73] Assignee: The Charles Stark Draper Laboratory, Inc., Cambridge, Mass.

[21] Appl. No.: 148,001

[22] Filed: Jan. 25, 1988

[51] Int. Cl.$^4$ .............................................. F16F 3/04
[52] U.S. Cl. ...................... 267/150; 33/520; 33/644; 267/103; 267/178; 267/289; 901/45
[58] Field of Search .................. 267/166, 174, 178, 33, 267/81, 84, 85, 91, 93, 103; 33/169 C, 172 D, 520, 644; 901/45; 248/603, 605, 606, 614, 604

[56]             References Cited
        U.S. PATENT DOCUMENTS

| | | | |
|---|---|---|---|
| 355,197 | 12/1886 | Morris | 267/33 |
| 485,652 | 11/1892 | Pfingst | 267/166 |
| 2,068,269 | 1/1937 | Gabrielson | 267/178 X |
| 4,379,363 | 4/1983 | Whitney | 33/169 C |
| 4,414,750 | 11/1983 | De Fazio | 901/45 X |

FOREIGN PATENT DOCUMENTS

| | | | |
|---|---|---|---|
| 607438 | 10/1960 | Canada | 248/604 |
| 244311 | 4/1987 | Fed. Rep. of Germany | 901/45 |
| 501130 | 2/1939 | United Kingdom | 248/614 |
| 622346 | 4/1949 | United Kingdom | 267/178 |

Primary Examiner—George E. A. Halvosa
Attorney, Agent, or Firm—Joseph S. Iandiorio; Brian M. Dingman

[57]            ABSTRACT

An improved remote center compliance (RCC) device having translational and rotational compliance. The RCC device includes at least two spaced monolithic members having a common axis extending therethrough. Adjacent pairs of monolithic members are interconnected by a stage including at least three discrete coil springs spaced about the axis of the monolithic members. Each spring is axially extensible and laterally deformable for providing both rotational and translational compliance about a center of compliance. The improvement includes providing coil springs that are at least partially coil-bound to increase the ratio of axial stiffness to lateral stiffness of the springs and increase the projection of the center of compliance away from the RCC device.

25 Claims, 3 Drawing Sheets

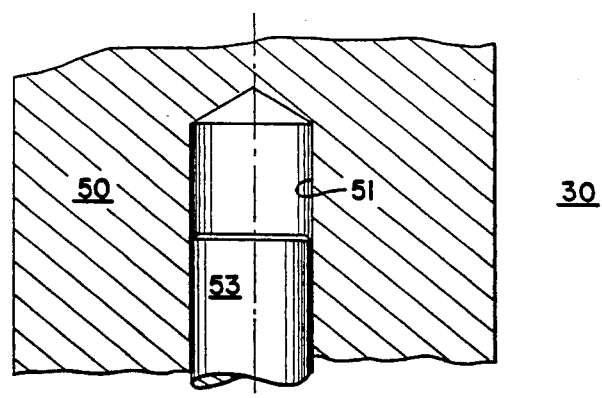
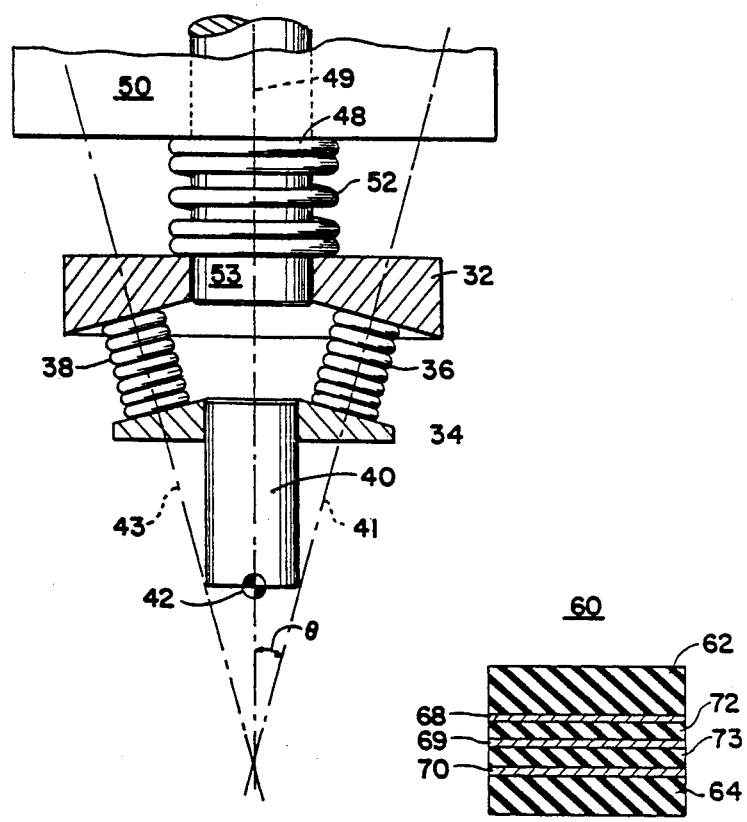
Fig. 3A
Fig. 3B

REMOTE CENTER COMPLIANCE DEVICE WITH FULLY OR PARTIALLY COIL-BOUND SPRINGS

FIELD OF INVENTION

This invention relates to an improved remote center compliance (RCC) device utilizing fully or partially coil-bound springs as compliant elements to provide full translational and rotational compliance.

BACKGROUND OF INVENTION

Conventional remote center compliance (RCC) devices employ one or two stages or portions of movable or deformable elements to provide the necessary combination of independent translational and rotational compliant action. Two stage RCC devices are disclosed in U.S. Pat. Nos. 4,098,001, and 4,155,169. Typically, these two stage devices include one stage having a set of deformable elements which lie along radii from a center, and a second stage having a set of deformable elements which are either parallel to each other or generally transverse to the first set. Together, these two stages provide the translational and rotational compliance of the RCC device. Each stage typically includes deformable elements, shear pads of alternating elastomer and metal layers, or open-coil springs. Single stage RCC devices, for example U.S. Pat. No. 4,414,750, include a single stage having a set of deformable elements axially disposed along generatrices of a cone. Typically, the deformable elements are either open-coil springs or shear pads of alternating metal and elastomer layers. This single stage provides both rotational and translational compliance.

Although single stage RCC devices are simpler and less expensive to manufacture than the two stage devices, both the shear pad and open-coil spring RCC devices exhibit problems which have kept them from being widely used as automatic insertion aids. The shear pad RCC devices perform satisfactorily, but only within fairly small ranges of motion. If the pads are repeatedly subjected to the high shear strains resulting from relatively large misalignment between the RCC device and the workpiece, the elastomer layers tend to fatigue and tear. This fatigue causes the shear pads to eventually lose their integrity, thereby causing the RCC device to become ineffective. In addition, since shear pads are relatively expensive, single stage shear pad RCC devices are not cheap enough to be widely used in industry.

Single stage RCC devices employing conventional coil springs as deformable elements are generally less expensive to manufacture than the shear pad RCC devices, but their center of compliance does not project a useful distance from the device. Although an RCC device with a non-projected center of compliance does have some efficacy, it does not have the efficacy or characteristic remote center of compliance of a true RCC device. Thus, conventional coil spring insertion aids should not be considered true RCC devices, and are not effective for use in operations requiring the rotational and translational compliant characteristics of an RCC device.

SUMMARY OF INVENTION

It is therefore an object of this invention to provide an improved, simple remote center compliance (RCC) device.

It is a further object of this invention to provide an improved RCC device having its center of compliance projected a useful distance from the device.

It is a further object of this invention to provide an improved RCC device which uses coil-bound or partially coil-bound springs as its discrete deformable elements.

It is a further object of this invention to provide an improved RCC device that is extremely inexpensive to manufacture.

It is a further object of this invention to provide an improved RCC device which uses discrete deformable elements that have an extremely long useful life.

This invention results from the realization that an improved, inexpensive remote center compliance (RCC) device can be made by using partially or fully coil-bound springs having greater axial than lateral stiffness as discrete deformable elements to project the center of compliance away from the device a useful distance.

An improved remote center compliance (RCC) device having translational and rotational compliance may be accomplished by using partially or fully coil-bound springs as compliant elements to increase the ratio of axial stiffness to lateral stiffness of the springs and increase the projection of the center of compliance away from the RCC device. The RCC device may be a single or multi-stage device. The springs may be either partially or fully coil-bound. Partially coil-bound springs are extensible and compressible, and fully coil-bound springs are axially extensible only. The springs may be axially disposed along generatrices of a cone which may have its vertex on or near the axis of the monolithic members.

For a single stage device, the RCC includes two monolithic members interconnected by a single stage including at least three coil springs. Preferably, the axial stiffness of the springs is at least as great as their lateral stiffness. The ratio of axial stiffness to lateral stiffness is preferably between 1 and 100, and may be approximately 30.

The springs may or may not be identical and may or may not all be wound in the same direction. In addition, the springs may or may not be preloaded. Preferably, the RCC device includes identical springs that are equally spaced bout the axis of the monolithic members, and the remote center falls on this axis.

When all of the springs are coil-bound, the RCC device may further include a support structure spaced from the RCC device and interconnected to it by at least one axially compressible discrete element for providing axial compliance to the RCC device. This axially compressible discrete element may be a coil spring which may or may not be partially coil-bound, or may be a shear pad of alternating stiff material and less stiff elastomeric laminations. Preferably, this axially compressible discrete element is also axially extensible. There may also be an associated mechanism to constrain any cocking rotations. This mechanism may be a pin attached to the support structure that rides inside of the coil spring and engages the hole in the upper annular monolithic member of the RCC device.

In a preferred embodiment, the single stage RCC includes springs with axes that form an angle of less than 40 degrees with the axis of the monolithic members. This projects the center of compliance a useful distance away from the RCC device to create a true remote center compliance device.

DISCLOSURE OF PREFERRED EMBODIMENT

Other objects, features and advantages will occur from the following description of a preferred embodiment and he accompanying drawings, in which FIG. 1 is a partial cross-sectional view taken along line 1—1 of FIG. 2 of an improved remote center compliance device according to this invention;

FIG. 3A is a partial cross-sectional view of an improved remote center compliance device having fully coil-bound springs according to this invention;

FIG. 3B is a cross-sectional view of an alternative discrete deformable element of the device of FIG. 3A;

An improved remote center compliance (RCC) device according to this invention may be accomplished by using coil springs that are at least partially coil-bound as discrete deformable elements of the RCC device to increase the ratio of axial stiffness to lateral stiffness of the elements under compression and increase the projection of the center of compliance away from the device. The RCC device can be a single or multiple stage device. A single stage device has two spaced monolithic members having a common axis interconnected by a single stage including at least three discrete coil springs spaced about this axis. A multiple stage device has at least three monolithic members having a common axis. Adjacent pairs of monolithic members are interconnected by stages, each stage including at least three discrete coil springs spaced about the axis. If the coil springs are fully coil-bound, they are not axially compressible. In this case, axial compliance may be provided by including at least one axially compressible discrete element interconnecting the RCC device to a separate, spaced support structure.

Preferably, each spring is axially disposed along a generatrix of a cone, and the axis of the cone is coincident with that of the monolithic members. Each spring typically has a greater axial than lateral stiffness in compression. The ratio of axial to lateral stiffness is typically between 1 and 100, and is preferably approximately 30. In addition, all of the springs may be wound in the same direction. Alternatively, at least one of the springs may be wound in an oppositely directed helical path than the rest of the springs. Preferably, all of the springs are identical and they are equally spaced about the axis of the monolithic members. This arrangement provides a remote center of compliance that falls on the axis of the device. To maximize the projection of the remote center away from the device, each of the springs preferably forms an angle with the axis of the monolithic members of less than 40 degrees.

In another embodiment, the springs are completely coil-bound. Axial compliance may then be provided by including a support structure spaced from the RCC device and interconnected to it by at least one axially compressible discrete element and, if necessary, a structure to enforce axial extension or compression with no rotation. This discrete element may be a coil spring that may or may not be partially coil-bound with associated structure to constrain any cocking rotations. Alternatively, the element can be a shear pad of alternative stiff material and less stiff elastomeric laminations. Preferably, the axially compressible element is also axially extensible. The structure to prevent rotation can be a single telescoping plunger tube arrangement, multiple plungers, or any of well-known crosshead mechanisms.

Figure 1:
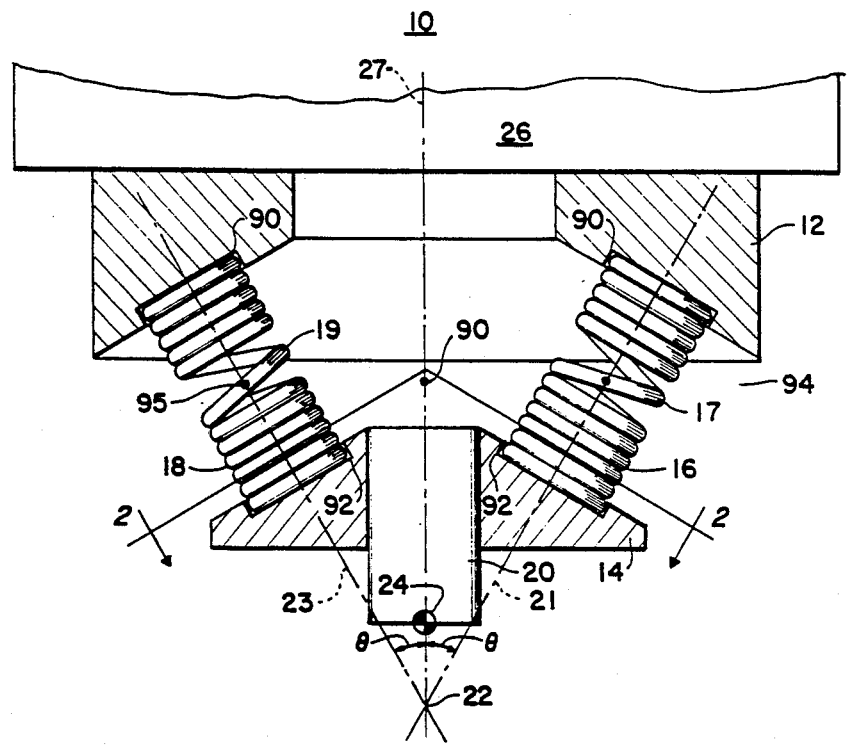
Figure 2:
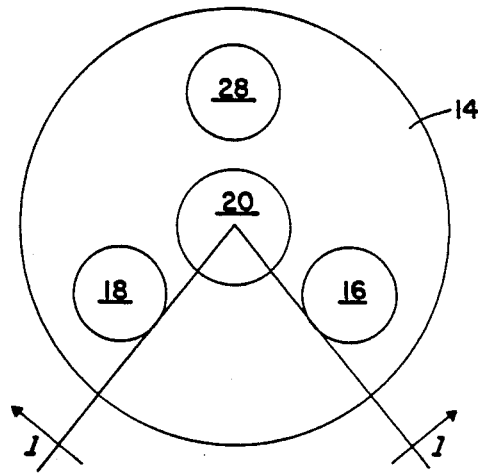
FIG. 2 is a partial sectional plan view taken along line 2—2 of FIG. 1.

There is shown in FIG. 1 an improved single stage remote center compliance (RCC) device 10. RCC device 10 is mounted on a supporting device 26 and carries operator member 20. Operator member 20 is not part of the invention; rather, it is the device that the RCC device supports and installs. RCC device 10 includes upper, 12, and lower, 14, monolithic annular device 10. Monolithic members 12 and 14 may be annular metal plates, each of which includes three recesses, only two of which, 90 and 92, are shown, for receiving three discrete elements 16, 18 and 28, FIG. 2, of RCC device 10. Although only three discrete coil springs 16, 18, 28, are illustrated in FIGS. 1 and 2, this is not a necessary limitation of the invention, as more than that number may be used. In addition, although only a single stage of coil springs, for example stage 94, FIGS. 1 and 2, including partially coil-bound springs 16, 18, and 28, is illustrated in FIGS. 1 and 2, this is not a necessary limitation of the invention, as more than that number may be used. Partially coil-bound springs 16, 18 and 28 are axially compressible and extensible and laterally deformable, and in combination provide the full rotational and translational compliance basic to the function of an RCC device.

Springs 16, 18 and 28 each include a single open coil, for example coil 19 of spring 18 and coil 17 of spring 16. The rest of the coils of each of the elements are coil-bound. Almost fully coil-bound springs such as springs 16, 18 and 28 in compression have a greater axial than lateral stiffness. Since the ratio of axial to lateral stiffness of the deformable elements of an RCC device determines the projection of the remote center of compliance away from the device, by using coil-bound springs as discrete deformable elements in an RCC device, each preferably being at least as stiff axially as laterally, and preferably approximately 30 times stiffer axially than laterally, the center of compliance is projected a useful distance away from the RCC device to provide a compliant device that in compression is a true RCC device.

Center of compliance 24, FIG. 1, lies at or near the end of operator member 20. Each partially coil-bound spring 16, 18 and 28, is axially disposed along a generatrix of a cone from focus 22 of RCC device 10. To increase the projection of the remote center 24 away from RCC device 10, the axes of the springs, for example axes 23 and 21, form an angle, theta, with axis 27 of RCC device 10 of less than 40 degrees.

As an example of the projection of center of compliance 24 from RCC device 10, a prior art device utilizing open coil springs as compliant elements has a center of compliance that is not projected from the device. The projection of a center of compliance may be measured from the center line of the compliant elements, which corresponds approximately to point 90 on axis 27, to center of compliance 24. The projection of the remote center from this center line point for an open coil RCC is typically about zero. Since the prior art open coil spring RCC's do not have a remotely projected center of compliance, the compliance at the end of their operating member where work takes place lacks the special characteristic of decoupling of force and rotation, moment and translation. Thus, these prior art devices are merely compliant insertion aids.

In contrast, an RCC device with partially or fully coil-bound springs as compliant elements according to this invention, for example RCC 10, FIG. 1, has a projected center of compliance. Projection is typically measured as a multiple of the ratio of P over R. P is the distance along axis 27 from spring mid-point 90 to RCC 24. R is the distance along axis 23 from spring mid-point 95 to spring axis focus 22. As an example, the projection of an RCC device having springs with 32 coils including one free or active coil, the projection ratio would be up to 1.5 depending on the conical angle, theta. These springs would have a ratio of axial to lateral stiffness of approximately 12.

Since the projection of the remote center from the RCC device is proportional to the ratio of axial to lateral stiffness of the springs, an RCC device according to this invention can be designed with the center of compliance projected a desired amount. This can be done by choosing springs with a total coil count and a free coil count that provides a desired axial to lateral stiffness, and by aligning the springs at a desired angle to achieve a desired projection.

An RCC with fully coil-bound springs is shown in FIG. 3A. RCC 30 includes fully coil-bound springs such as springs 36 and 38 as its single stage of elements. Fully coil-bound springs 36 and 38 have little or no axial compressive compliance but still possess lateral compliance. Partially open coil spring 48, with open coil 52, is attached to annular member 32 and machine interface 50. Spring 48 provides axial or Z-axis compliance to RCC 30. Pin 53 is attached to member 32 and rides in recess 51 in interface 50. Pin 53 constrains movement of member 32 so it may not cock relative to machine interface 50.

Fully coil-bound springs such as springs 36 and 38 have a greater ratio of axial to lateral stiffness than partially coil-bound springs, and thus the center of compliance of the device is projected farther than the device of FIG. 1. As in the partially open-coil spring embodiment described in conjunction with FIG. 1 above, RCC 30 can be designed with a desired projection of its center of compliance 42. This is accomplished by providing a Z-axis compliance spring 48 that has a desired ratio of axial to lateral stiffness, by providing a crosshead mechanism or a slide mechanism or other constraint to prevent cocking rotations between elements 50 and 32, and by aligning axes 41 and 43 of elements 36 and 38 with axis 49 of RCC device 30 at a desired conical angle theta.

Z-axis compliant member 48, FIG. 3A, could also be a shear pad of alternating stiff and less stiff laminations as shown in FIG. 3B. Such a shear pad could incorporate the function of the crosshead mechanism by virtue of its own cocking stiffness or constraint. Shear pad 60 includes elastomer layers 62, 64, 72 and 73. These layers are separated by metal shims or washers 68–70. These shear pads can be designed to have a wide range of ratios of axial to lateral stiffness for desired applications as is well known in the art.

Figure 4A:
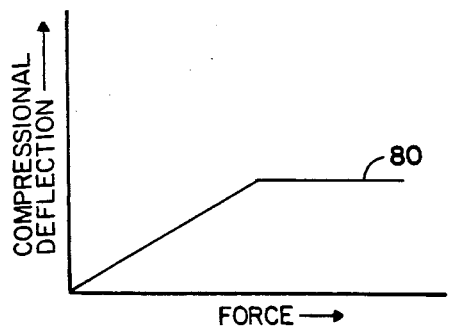
FIG. 4A is a graph of the reaction of a non-preloaded partially coil-bound spring to a compressive force.
Figure 4B:
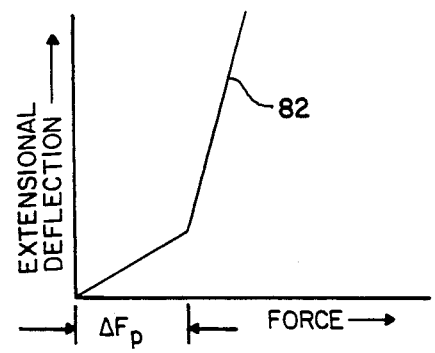
FIG. 4B is a graph of the reaction of a preloaded partially coil-bound spring to an extensive force.

FIGS. 4A, 4B, 5A and 5B graphically depict the result of applying force to partially and fully coil-bound springs that are or are not preloaded. Graph line 80, FIG. 4A, shows the relationship of compressive axial deflection to force for a non-preloaded partially-coil-bound spring. The free coil compresses fairly uniformly as the force is applied until it becomes coil bound. At this point, deflection stops until the spring material itself deforms. Graph line 82, FIG. 4B, shows the extensive axial deflection of a partially-coil-bound spring that is preloaded. The spring will extend very little until the preloading force, delta $F_p$, is overcome. Beyond this point, extension increases normally.

Figure 5A:
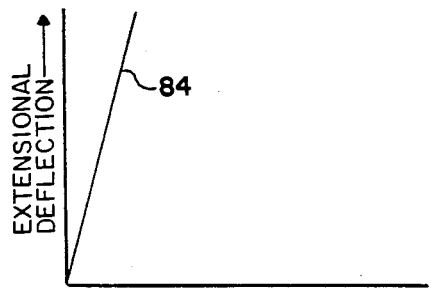
FIG. 5A is a graph of the reaction of a non-preloaded fully coil-bound spring to an extensive force.
Figure 5B:
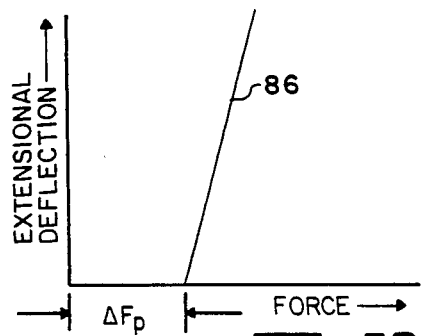
FIG. 5B is a graph of the reaction of a preloaded fully coil-bound spring t an extensive force.

A similar set of graphs for a fully coil-bound spring is shown in FIGS. 5A and 5B. Graph line 84 shows a relationship between axial extension and force for a fully coil-bound, non preloaded spring. Graph line 86 shows the relationship for a preloaded fully coil-bound spring. Threshold force delta $F_P$ is the preloading force that must be overcome before the preloaded coil-bound spring begins to extend. Once the spring begins to extend, extension follows graph line 86, which has the same slope as graph line 84, FIG. 5A, and indicates that extension is proportional to force.

As a result of using partially or fully coil-bound springs as compliant elements, an RCC device may be designed with a center of compliance projected to virtually any useful point. The RCC may also be designed to have a threshold or preload force which must be overcome before substantial axial tensional deformation takes place.

Although specific features of the invention are shown in some drawings and not others, this is for convenience only as each feature may be combined with any or all of the other features in accordance with this invention.

Other embodiments will occur to those skilled in the art and are within the following claims:

What is claimed is:

1. In an improved center compliance (RCC) device having translational and rotational compliance, said RCC including at least two spaced monolithic members having a common axis extending therethrough, each adjacent pair of said monolithic members interconnected by a stage including at least three discrete coil springs spaced about the axis of said monolithic members, each said spring being axially extensible and laterally deformable for providing both rotational and translational compliance about a center of compliance, the improvement comprising: said coil springs in said stage being substantially coil-bound to make their axial stiffness greater than their lateral stiffness, and also being axially disposed at an angle of less than 40 degrees to the axis of said monolithic members to project said center of compliance away from said RCC device.

2. The improved RCC device of claim 1 in which each said spring is axially disposed along a generatrix of a cone whose vertex lies proximate the axis of said monolithic members.

3. The improved RCC device of claim 2 in which said RCC device includes two monolithic members and a single stage of coil springs.

4. The improved RCC device of claim 1 in which the ratio of axial stiffness to lateral stiffness of said springs is between 1 and 100.

5. The improved RCC device of claim 4 in which the ratio of axial stiffness to lateral stiffness is approximately 30.

6. The improved RCC device of claim 1 in which said springs are axially compressible.

7. The improved RCC device of claim 1 in which said springs are all wound in the same direction.

8. The improved RCC device of claim 1 in which at least one of said springs is wound in an oppositely directed helical path than the rest of said springs.

9. The improved RCC device of claim 1 in which said springs are preloaded.

10. The improved RCC device of claim 1 in which all of said springs are identical.

11. The improved RCC device of claim 1 in which said springs are equally spaced about the axis of said monolithic members.

12. The improved RCC device of claim 1 in which said center of compliance falls on the axis of said monolithic members.

13. The improved RCC device of claim 1 further including a support structure spaced from said RCC device and interconnected to said RCC device by at least one axially compressible discrete element for providing axial compliance to said RCC device.

14. The improved RCC device of claim 13 in which said axially compressible discrete element is a coil spring.

15. The improved RCC device of claim 14 in which said coil spring is partially coil-bound.

16. The improved RCC device of claim 13 in which said axially compressible discrete element is a shear pad of alternating stiff material and less stiff elastomeric laminations.

17. The improved RCC device of claim 13 in which said element is axially extensible.

18. The improved RCC device of claim 13 in which said springs are preloaded.

19. The improved RCC device of claim 13 further including means for preventing cocking rotation between said RCC device and said support structure.

20. The improved RCC device of claim 19 in which said means for preventing cocking rotation includes at least one pin attached to said support structure, each said pin engaging a complementary hole in said RCC device.

21. In an improved remote center compliance (RCC) device having translational and rotational compliance, said RCC including two spaced monolithic members having a common axis extending therethrough interconnected by at least three discrete coil springs spaced about said axis, said springs being axially disposed along generatrices of a cone and being axially compressible and extensible and laterally deformable for providing both rotational and translational compliance about a center of compliance, the improvement comprising: said coil springs being substantially but not fully coil-bound to make the ratio of axial stiffness to lateral stiffness greater than one, the axis of each said spring forming an angle of less than 40 degrees with the axis of said monolithic members to project said center of compliance away from said RCC device.

22. The improved RCC device of claim 21 in which the ratio of axial stiffness to lateral stiffness of said springs is between 5 and 50.

23. The improved RCC device of claim 21 in which said springs are preloaded.

24. In an improved remote center compliance (RCC) device having translational and rotational compliance, said RCC including two spaced monolithic members having a common axis extending therethrough interconnected by at least three discrete coil springs spaced about said axis, said springs being axially disposed along generatrices of a cone and being axially extensible and laterally deformable for providing both rotational and translational compliance about a center of compliance, the improvement comprising: said coil springs being substantially coil-bound to make their axial stiffness greater than their lateral stiffness and also being axially disposed at an angle of less than 40 degrees to the axis of said monolithic members to project said center of compliance away from said RCC device.

25. In an improved remote center compliance (RCC) device having translational and rotational compliance, said RCC including at least two spaced monolithic members having a common axis extending therethrough, each adjacent pair of said monolithic members interconnected by a stage including at least three discrete coil springs spaced about the axis of said monolithic members, each said spring being axially compressible and extensible and laterally deformable for providing both rotational and translational compliance about a center of compliance, the improvement comprising: said coil springs in said stage being substantially but not fully coil-bound to make the ratio of axial stiffness to lateral stiffness greater than one, and also being axially disposed at an angle of less than 40 degrees to the axis of said monolithic members to project said center of compliance away from said RCC device.

* * * * *